May 23, 1967 W. O. DUNNICAN 3,321,710

TIME-COMPRESSION SYSTEM EMPLOYING MEANS TO SELECTIVELY ALTER TIME-COMPRESSION FACTOR WITHOUT CHANGING LENGTH OF DELAY MEDIUM

Filed Dec. 31, 1964

INVENTOR
W. O. DUNNICAN
BY G. E. Hirsch Jr.
ATTORNEY

United States Patent Office 3,321,710
Patented May 23, 1967

3,321,710

TIME-COMPRESSION SYSTEM EMPLOYING MEANS TO SELECTIVELY ALTER TIME-COMPRESSION FACTOR WITHOUT CHANGING LENGTH OF DELAY MEDIUM

William O. Dunnican, Totowa Borough, Passaic County, N.J., assignor to Bell Telephone Laboratories, Incorporated, New York, N.Y., a corporation of New York Filed Dec. 31, 1964, Ser. No. 422,719
14 Claims. (Cl. 328—55)

Figures 1, 2:
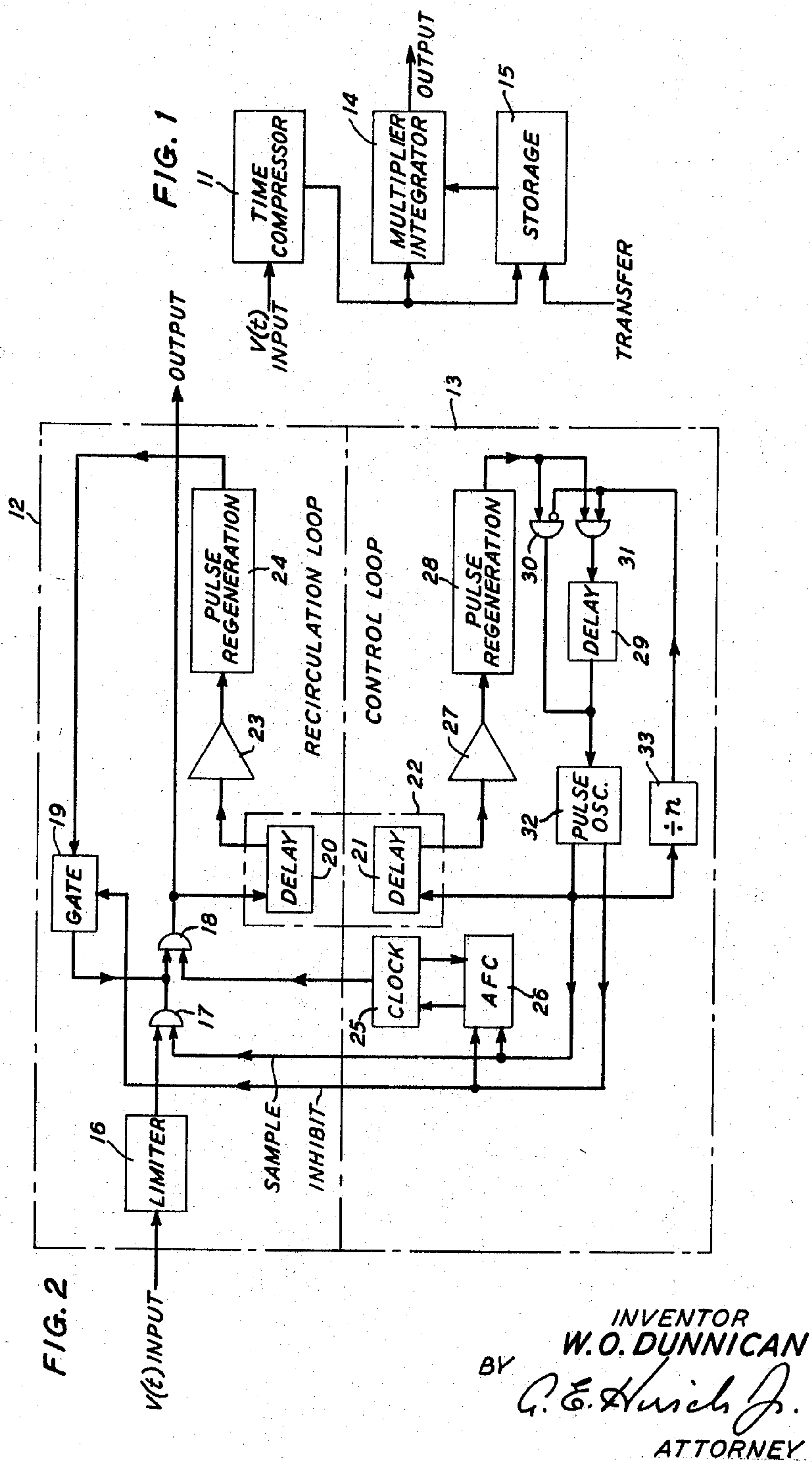

This invention pertains to the time compression of signals and, more particularly, to an improved system for the compression of signals in which time compressed samples of an applied signal are recirculated through a delay medium.

The conventional time compression storage system, commonly denoted by the acronym "deltic," comprises apparatus for continuously processing signals without loss of information content. It finds use in signal detection systems employing spectrum analysis, auto-or-cross correlation or the like. In prior art deltic systems, samples of an applied input wave, developed at predetermined intervals of time, are circulated in pulse form in a delay medium. The delay interval of the medium differs from the sampling interval by a small period or interval of time. Logic circuitry is provided, responsive to inhibiting signals developed simultaneously with the sampling signals, for inhibiting further circulation of the pulses upon their coincidence in time with the inhibiting signals. More simply stated, a circulating pulse is inhibited if it appears at the output of the delay medium at the same time that sampling is taking place. Understandably, since the electrical length of the medium differs by a small interval or "bit" of time from the sampling interval, a circulating pulse will "slip" back into the delay medium before the insertion of a new sampled pulse. These pulses are, of course, separated by an interval corresponding to this small bit of time. With each circulation, the pulse precesses in the delay medium an amount equal to this small interval of time. After a number of circulations, dependent on the length of the delay medium and the size of the interval, the recirculating pulse appears at the output of the delay medium coincident in time with sampling and is thus inhibited. Insertion of "new" pulses continues, while those which have precessed the total length of the delay medium are extinguished. A compressed replica of the sampled input signal is therefore continuously recirculating in the loop, i.e., the electrical path which includes the delay medium. Compression is effected by a factor equal to the quotient of the sampling interval divided by the pulse separation in the delay medium.

Generally, the sampling signals are developed by an oscillator regeneratively triggered by pulses circulated in an auxiliary delay medium. The delay of this control loop, the electrical path including the auxiliary medium, differs from that of the recirculation loop by a small amount or bit equal to the pulse spacing of the recirculating information pulses. The control loop is necessary because of the nature of the delay media used, conventionally, temperature sensitive silica or quartz delay lines. Thus, to ensure that the sampling interval always differs from the delay of the recirculating loop by a fixed bit of time, it has been found expedient to introduce the same temperature dependency into the sampling apparatus. By enclosing the delay media together in an isothermal canister, temperature variations are countervailed.

As previously mentioned, the time compression factor of the deltic is dependent on the quotient of the sampling interval divided by the pulse separation in the recirculating loop. It, of course, follows that all frequency components of the applied input wave are likewise increased by the same factor. It is frequently necessary, for example, in spectrum analysis, to improve the resolving power of the analyzer. This may be done by increasing the time compression factor. The increase may be accomplished by lengthening the sampling interval or by decreasing the pulse space interval of the recirculating information. Generally, the pulse space interval is minimized to maximize the number of pulses circulating in the delay medium. Thus, the only recourse is to increase the time interval between sampling signals. This is accomplished in the prior art by increasing the electrical length of the delay media. Reliance on this technique is replete with problems. For example, "state of the art" limitations of available delay lines seriously curtail the extent to which the delay of the lines may be increased. In addition, as recourse is made to longer delay lines, losses increase and more elaborate circuitry is required, with a concomitant increase in cost. Furthermore, the effective storage time of the deltic increases as the square of delay line length, greatly increasing the redundancy of the system.

It is, therefore, an object of this invention to increase the compression factor of a time compression storage circuit without incurring the detriments inherent in the techniques of the prior art.

Another object of the present invention is to increase the compression factor of a storage circuit without requiring a corresponding increase in the electrical length of the delay media.

Yet another object of this invention is to provide means for conveniently and economically altering the time compression factor of a storage circuit.

These objects are accomplished, in accordance with the present invention, by a technique of selective precession. Only selected samples of an input wave are allowed to precess in the delay medium of the recirculation loop. More particularly, the compression factor of the storage circuit is increased by allowing only every $n^{th}$, a preselected numerical value, sample of an applied input wave to precess in the recirculation loop and a second, auxiliary control loop are established with identical electrical lengths, corresponding to a delay time T. A pulse of sampled information, after circulation through the delay medium, is inhibited, since the circulated pulses and sampling signals are coincident in time. Every $n^{th}$ sampling interval, a minute value or bit of delay, of electrical length $t$, is introduced into the electrical path of the control loop. Thus, every $n^{th}$ sampling interval is of a duration $T+t$. Pulses circulated during these extended intervals therefore "slip" back into the delay medium and precess in a conventional fashion. Shortening the delay interval of the control loop by an amount $t$ would effect the same result. Circulation of only every $n^{th}$ sampled pulse effectively increases the sampling interval by a factor $n$. This increase is advantageously obtained without the necessity of a corresponding increase in the electrical length of the delay media used. Assuming that the pulse separation interval in the recirculation loop corresponds to that of prior art systems, the time compression factor is increased $n$ times. Because of the ease and convenience by which this result is effected by the practice of this invention, the compression factor of a storage circuit may be conveniently and economically altered when so desired. Mere modification of the divisor of a divider circuit is all that is required to effect a corresponding change in the compression factor. Thus, without recourse, to expensive and time consuming modifications, the capability and usefulness of conventional deltic circuits is significantly improved.

These and further features and objects of the invention, its nature and various advantages, will be readily apprehended upon consideration of the attached drawings and of the following detailed description of the drawings.

In the drawings:

FIG. 1 is a block diagram of an autocorrelator circuit employing the signal time compression storage system of the present invention; and FIG. 2 is a block diagram showing in detail the signal time compression storage system of the present invention.

The present invention may be used in a variety of systems. Advantageously, it finds use in systems for developing the autocorrelation function of a signal. Briefly, the autocorrelation function of a signal is obtained by multiplying a sample of an incoming signal by a corresponding sample which has been delayed slightly. This instantaneous product is integrated and the process of multiplication and integration is then repeated for a series of different relative delay times. The resultant integrated product, plotted against the relative delay time, is the desired correlation function. Typical apparatus for carrying out these operations is illustrated in FIG. 1. An input signal V(*t*) is applied to time compressor apparatus 11, preferably constructed in accordance with the present invention. By implementing the principles of this invention, relative time delay is achieved by making use of the precession of selected data samples in the compressor. A storage channel 15, activated by a signal applied to the indicated "transfer" lead, is used to provide a stationary, i.e., nonprecessing, reference or comparison signal which consists of a stored replica of the sample sequence circulating in compressor 11 at an arbitrary time. This stationary replica is then multiplied by the precessing replica and integrated in multiplier-integrator circuit 14 during each successive recirculation period. The relative delay between the stationary replica and the precessing replica increases by one circulation pulse interval with each circulation. Thus, at the end of a time interval equal to the length of the originally applied signal the average product will have been obtained for a significant number of different values of delay. A new replica may be then applied to the stationary storage channel by activating the transfer lead of FIG. 1 and a new correlation function obtained during a succeeding time interval. In this way, none of the information in the incoming signal will be lost since there will be no gaps between successive segments of the signal which are "processed" one after the other.

The cross correlation of two independent input signals can be obtained by using a time compressor for each input to obtain a high speed replica of each signal. A replica of one of the input signals may then be stored in a stationary storage channel and compared with the precessing replica of the other input signal. As before, operation is enhanced by the use of a time compressor constructed in accordance with the present invention.

The time compression storage system of the present invention is illustrated in detail in FIG. 2. It may be considered to comprise two portions: recirculation loop 12, wherein time compressed samples of the information content of an applied wave are circulated, and control loop 13, wherein a unitary pulse signal is recirculated through a second delay medium to trigger regeneratively a pulse oscillator, whereby signals are developed for sampling the applied input wave and inhibiting further circulation.

Considering first the recirculation loop 12, an applied input signal V(*t*) is converted into square wave form by a limiting amplifier 16. This converted signal is applied to AND circuit 17 which is enabled by sample pulses developed by control loop 13. Sampled information of the applied signal is periodically transmitted by AND circuit 17 to a second AND circuit 18. Sampling normally takes place at intervals of time T, for example, every 707 microseconds. AND circuit 18 is enabled by a clock oscillator 25 at extremely short submultiples of the sampling interval. For example, in one typical application of the invention, circuit 18 is enabled every 0.1 microsecond. These enabling signals aid in synchronizing with the other time parameters of the circuit the insertion of the sampled pulses into delay medium 20. AND circuits 17 and 18 may be of any conventional type, for example, resistor-diode logic gate circuits.

The synchronized, sampled pulses of the information wave appearing at the output of AND circuit 18 are conveyed to delay medium 20, of electrical length T, corresponding to the aforementioned sampling interval. The information pulses propagated by delay medium 20 are, if desired, applied to amplifier 23 wherein any required compensation may be made for losses present in the delay medium. The amplified information pulses are thereupon supplied to a pulse regeneration network 24. Such networks are well known in the art and may comprise detector and filter circuits for reshaping the form of the circulated pulses. The reshaped pulses are conveyed to conventional gate circuit 19. Gate circuit 19 is controlled by inhibiting pulses developed within control loop 13 simultaneously with the development of sampling pulses.

Since the circulation time through delay medium 20 is identical to the duration of the sampling intervals, T, pulses circulated through the medium 20 will be inhibited at gate circuit 19. Thus, the operation of the circulation loop 12 is similar to that of the conventional deltic with the important exception that, as so far described, no time compression has occurred since circulated pulses are inhibited from further recirculation.

Control loop 13 is equipped with a pulse oscillator 32 regeneratively triggered by pulses circulated through delay medium 21. For purposes of exposition, if it is assumed that a pulse is developed at the output of oscillator 32, it will be conveyed to delay medium 21 of electrical length, T, identical to that of delay medium 20.

Delay media 20 and 21 may conveniently be acoustic or ultrasonic delay lines, for example, of the quartz or silica type. Such media and associated transducer circuitry are adequately described in "Ultrasonic Delay Lines," Brockelsby, Palfreeman and Gibson, London Iliffe Books, Ltd., 1963. The pulse propagated through delay medium 21 is, if desired, increased in magnitude by amplifier 27 and reshaped in a pulse regeneration network 28 similar to network 24. After reshaping, the pulse developed at the output of network 28 is transmitted by logic circuit 30, a normally enabled AND gate. The pulse, after a period of time, T, thus appears again at pulse oscillator 32, which is triggered, starting a new cycle of circulaton. The output of oscillator 32 comprises two separate but identical signals, sample and inhibit, for controlling the timing and functioning of recirculation loop 12. Pulse oscillator 32 may be a blocking oscillator of the type described on pages 282 to 285 of "Pulse and Digital Circuits," Millman and Taub, McGraw-Hill, 1956.

The precise timing required by compressor systems makes it imperative that delay variations with temperature be compensated. Any temperature induced alteration in the delay interval of the recirculation loop must be correspondingly reflected in the duration of the sample-inhibit period. It has been found expedient to introduce the same temperature dependence into the sampling apparatus by making the sampling period similarly dependent on delay medium variations with temperature. The information and control pulses may be circulated in the same medium. In the illustrative embodiment of the present invention, an auxiliary delay medium 21 is used. Both media 20 and 21 are enclosed within an isothermal canister 22 to countervail the effect of temperature variations.

The sampling and inhibiting signals developed by oscillator 32 are also applied to an AFC (Automatic Frequency Control) circuit 26 which may be of any conventional type. Circuit 26 locks the clock period to the sample-inhibit period. Thus, the period of the clock signals, controlled by AFC circuit 26, changes in proportion to delay media variations with temperature. Control loop 13 thus serves to minimize variations between the sampling interval and the recirculation interval.

It is apparent that the circulation time of loop 12 and the sampling interval duration are identical. Therefore, any information pulses circulated through the delay medium 20 will be inhibted by gate 19, and fail to develop a compressed replica of the input. In accordance with this invention, additional logic circuitry is provided in control loop 13 to assure the development of a time compressed replica. Thus, a divider circuit 33 is connected at the output of oscillator 32 to develop a control signal once for every $n$ output pulses of oscillator 32. Such divided circuits are well known and may comprise, for example, tandemly cascaded multivibrators. The signal developed by circuit 33 inhibits logic gate 30 and enables logic gate 31 every $n$ pulses developed by oscillator 32. As a result, a pulse circulated through delay medium 21, amplifier 27 and network 28, is conveyed via logic gate 31 to a delay network 29. Delay network 29 may be of any well-known type capable of providing a small amount of delay $t$, of the order of 0.1 microsecond. Thus, every $n^{th}$ sampling pulse, the pulse recirculated through medium 21, is additionally delayed an amount corresponding to a small bit of time $t$ by network 29. Every $n^{th}$ sampling interval will thus be extended an amount equal to this delay. In other words, every $n^{th}$ sampling interval will have a delay $T+t$. It is therefore apparent that an information pulse circulated in recirculation loop 12 will slip back into delay medium 20 before inhibition of gate circuit 19 takes place. All other information pulses circulated during these extended intervals of sampling will also be recirculated in delay medium 20 separated by an interval $t$. Accordingly, every $n^{th}$ sampled pulse is time compressed. Effectively, this is the same as increasing the sampling rate by a factor of $n$. The compression factor is, accordingly, increased by the same amount. It is to be noted that this increase is accomplished without resorting to any alteration of the delay media in the recirculation and control loops. The recirculating compressed replica of the input wave is conveniently available at the output of AND circuit 18.

It is to be understood that the embodiments shown and desecribed are illustrative of the principles of the invention only and that further modifications of this invention may be implemented by those skilled in the art without departing from the scope and spirit of the invention. For example, the principles of this invention may find use in any time compression circuit wherein information pulses are circulated through a delay medium, whether or not an independent delay medium is utilized for developing control signals.

What is claimed is:

1. A time compression storage system comprising, means for sampling an applied input wave at predetermined intervals of time to develop pulse signals representative of the information content of said applied wave, delay means, means responsive to said pulse signals for circulating said signals through said delay means, means responsive to said sampling means for inhibiting successive recirculation of said signals through said delay means when said sampling interval and the signal circulation interval through said delay means are substantially identical, and means for selectively altering the duration of said sampling intervals whereby signals circulated through said delay means during said altered intervals recirculate successively through said delay means.

2. A time compression storage system comprising, means for sampling an applied input wave at predetermined intervals of time to develop pulse signals representative of the information content of said applied wave, delay means, means responsive to said pulse signals for circulating said signals through said delay means, means responsive to said sampling means for inhibiting successive recirculation of said signals through said delay means when said sampling interval and the time for a signal to circulate through said delay means are substantially identical, and means for periodically extending the duration of said sampling intervals whereby signals circulated through said delay means during said extended intervals of time recirculate successively through said delay means.

3. Storage apparatus wherein a time compressed replica of an applied signal is recirculated through a delay medium comprising, in combination, means for sampling an applied input wave at predetermined intervals, T, to develop pulse signals representative of the information content of said applied signal, a delay medium of electrical length T, electrical path means, including means responsive to said pulse signals, for circulating said pulses through said delay medium, means responsive to said sampling means for inhibiting those circulated pulses coincident in time with said sampling, and means for periodically altering said sampling intervals T by an interval of time $t$ whereby pulses circulated during said altered intervals $T+t$ recirculate through said delay medium spaced at intervals of time $t$.

4. Signal time compression apparatus comprising, a closed conductive loop having a specified delay interval, means for sampling an applied input wave at periodic intervals of time to develop pulse signals representative of the information content of said wave, means for introducing said pulses into said conductive loop, means for periodically extinguishing said pulses after one passage around said conductive loop when said interval of sampling and said delay interval are substantially the same, means for periodically altering said interval of sampling, and means responsive to said altering means for disenabling said extinguishing means during said altered intervals of sampling.

5. Signal time compression apparatus as defined in claim 4 wherein said closed conductive loop includes an ultrasonic delay medium.

6. Signal time compression apparatus as defined in claim 4 wherein said sampling means comprises, a source of control signals, a delay medium responsive to said control signals for delaying said signals a period of time corresponding to said sampling intervals, and means responsive to said delayed control signals for regeneratively actuating said source of control signals.

7. Signal time compression apparatus comprising, a closed conductive loop, including a delay medium, having a specified delay interval T, means for sampling an applied input wave at periodic intervals of time, T, to develop pulse signals representative of the information content of said wave, means for introducing said pulses into said conductive loop, means for periodically extinguishing said pulses after one circulation around said conductive loop when said interval of sampling and said delay interval are substantially the same, means for periodically altering said interval of sampling by a small period of time $t$, and means responsive to said altering means for disenabling said extinguishing means during said altered intervals of sampling, whereby pulses circulated during said altered intervals recirculate around said conductive loop spaced at intervals of time *t*.

8. Time compression apparatus comprising, in combination,
a source of applied signals,
electrical path means, including a delay medium, having a delay interval corresponding to a time T,
means for sampling said applied signals at periodic intervals of time T,
means responsive to said sampling means for circulating samples of said applied signals in said electrical path means,
means for inhibiting said circulation when said interval of sampling and delay interval are identical,
and means for periodically extending said interval of sampling by a bit of time *t*.

9. Time compression apparatus as defined in claim 8 wherein said sampling means comprises,
a source of control signals,
a delay medium responsive to said control signals for delaying said signals a period of time corresponding to said sampling intervals T,
and means responsive to said delayed control signals for regeneratively actuating said source of control signals.

10. Time compression apparatus comprising, in combination,
a source of applied signals,
closed electrical path means, including a delay medium, having a delay interval corresponding to a time T,
means for sampling said applied signals at periodic intervals of time T,
means responsive to said sampling means for circulating samples of said applied signals in said electrical path means,
means for inhibiting further circulation when the appearance of a circulated sample coincides in time with the occurrence of said sampling,
and means for recirculating selected samples by periodically extending said interval of sampling by a minute value of time.

11. A time compression storage system comprising,
a source of control signals,
control loop means for circulating said control signals through a delay medium of electrical length T,
means responsive to said circulated control signals for sampling an applied input wave at intervals of time corresponding to the time of circulation of said control signals,
recirculation loop means responsive to said sampling means for circulating samples of said input wave through a delay medium of electrical length T,
means responsive to said sampling means for inhibiting said samples after one circulation through said delay medium when said interval of sampling and the delay interval of said recirculation loop means are identical,
and means for introducing a minute value of delay of electrical length *t* into said control loop means for the duration of every $n^{th}$, a preselected numerical value, sampling interval.

12. Apparatus for storing a time compressed replica of an applied input signal comprising,
means for sampling said signal at predetermined intervals of time to obtain pulse samples representative of the information content of said signal,
a first closed conductive path having a specified delay interval for circulating said pulse samples,
means for introducing said pulse samples into said first path,
a second closed conductive path having a delay interval identical to that of said first path and equal to said intervals of sampling for circulating an applied control pulse,
means responsive to said circulated control pulse for actuating said sampling means,
means for periodically inserting a small amount of delay into said second path thereby altering said intervals of sampling by a corresponding small period of time,
and means responsive to said sampling means for extinguishing those pulses circulated in said first path during said unaltered intervals of sampling.

13. In combination, a source of control signals,
control loop means for propagating said control signals through a delay medium of electrical length T,
means responsive to said propagated control signals for regeneratively actuating said source of control signals at intervals of time corresponding to the time of propagation of said control signals,
logic means responsive to said control signals for developing samples of an applied input wave,
information loop means for propagating said samples of said input wave through a delay medium of electrical length T,
means responsive to said control signals for inhibiting said samples after propagating once through said delay medium when the propagation time of said control loop and said information loop are substantially identical,
divider means responsive to said control signals for developing an enabling signal once for every *n*,
a preselected numerical value, of said control signals,
delay means of electrical length *t* for increasing the propagation time of every $n^{th}$ control signal by a period of time *t*,
and means responsive to said enabling signals for gating said delay means into said control loop for the duration of every $n^{th}$ enabling signal.

14. In combination, logic means for sampling an applied input wave at intervals of time to develop pulse samples representative of the information content of said wave,
a first closed conductive path having a specified delay interval,
a source of timing signals,
means responsive to said timing signals for propagating said pulse samples around said first path,
a source of control signals,
a second closed conductive path having a delay interval identical to that of said first path for propagating said control signals,
means responsive to said propagated control signals for regenerenatively actuating said source of control signals,
means responsive to said control signals for actuating said logic means at intervals of time corresponding to the propagation time of said control signals,
switching means responsive to said control signals for periodically altering the delay interval of said second path thereby altering said intervals of sampling,
and gating means responsive to said control signals for inhibiting those pulses propagated in said first path during said unaltered intervals of sampling.

References Cited by the Examiner

UNITED STATES PATENTS

| | | | |
|---|---|---|---|
| 2,958,039 | 10/1960 | Anderson | 328—129 X |
| 3,206,686 | 9/1965 | Goor | 328—55 X |
| 3,223,981 | 12/1965 | Fischer | 328—55 X |

ARTHUR GAUSS, *Primary Examiner.*

J. HEYMAN, *Assistant Examiner.*